(12) United States Patent
Lausten et al.

(10) Patent No.: US 7,823,376 B2
(45) Date of Patent: Nov. 2, 2010

(54) THRUST AUGMENTATION IN PLUG NOZZLES AND EXPANSION-DEFLECTION NOZZLES

(75) Inventors: Merlyn Lausten, Rescue, CA (US); Melvin J. Bulman, Folsom, CA (US)

(73) Assignee: Aerojet-General Corporation, Sacramento, CA (US)

( * ) Notice: Subject to any disclaimer, the term of this patent is extended or adjusted under 35 U.S.C. 154(b) by 596 days.

(21) Appl. No.: 11/226,127

(22) Filed: Sep. 13, 2005

(65) Prior Publication Data

US 2007/0056261 A1  Mar. 15, 2007

(51) Int. Cl.
*F02K 9/00* (2006.01)
*B63H 25/46* (2006.01)
(52) U.S. Cl. .................................. 60/258; 239/265.17
(58) Field of Classification Search ................ 60/257, 60/258, 200.1, 770, 761; 239/127.3, 265.17
See application file for complete search history.

(56) References Cited

U.S. PATENT DOCUMENTS

| | | | |
|---|---|---|---|
| 2,286,909 A | 12/1940 | Goddard | |
| 2,939,275 A | 6/1960 | Loedding | |
| 2,952,123 A | 9/1960 | Rich | |
| 2,981,059 A | 4/1961 | Horner et al. | |
| 3,032,970 A | 5/1962 | Fox | |
| 3,091,924 A | 6/1963 | Wilder, Jr. | |
| 3,095,694 A | 7/1963 | Walter | |
| 3,120,737 A | 2/1964 | Holloway | |
| 3,128,599 A | 4/1964 | Carr | |
| 3,147,590 A | 9/1964 | Thielman | |
| 3,150,485 A * | 9/1964 | Hickerson | 60/258 |
| 3,151,446 A | 10/1964 | Parilla | |
| 3,203,651 A * | 8/1965 | Garrett | 244/58 |
| 3,233,833 A | 2/1966 | Bertin et al. | |
| 3,344,605 A * | 10/1967 | Mageean et al. | 60/258 |
| 3,374,631 A | 3/1968 | Marks | |
| 3,482,404 A * | 12/1969 | Kircher et al. | 60/259 |
| 3,668,872 A | 6/1972 | Camp et al. | |
| 3,698,642 A | 10/1972 | McCullough | |
| 3,739,984 A | 6/1973 | Tontini | |

(Continued)

OTHER PUBLICATIONS

Charles D. Brown, Elements of Spacecraft Design, 2002, American Insitute of Aeronautics and Astronuatics, Inc., pp. 156 & 159.*

(Continued)

*Primary Examiner*—Michael Cuff
*Assistant Examiner*—Gerald L Sung
(74) *Attorney, Agent, or Firm*—Townsend and Townsend and Crew LLP

(57) ABSTRACT

Thrust augmentation in a rocket nozzle is achieved by incorporating injectors for the introduction of unburnt fuel and oxidizer into a nozzle to combust in the nozzle and thereby supplement the primary thrust that is supplied by fuel and oxidizer that are combusted prior to entry into the nozzle. These secondary injectors are incorporated into the design of expansion-deflection nozzles and plug nozzles. In expansion-deflection nozzles, the injectors are either in the flow deflector itself or in the wall of the divergent section of the nozzle. In plug nozzles, the injectors are either in a shell of the nozzle surrounding the forward end of the centerbody or in the centerbody itself.

11 Claims, 6 Drawing Sheets

U.S. PATENT DOCUMENTS

| | | | |
|---|---|---|---|
| 3,759,039 | A | 9/1973 | Williams |
| 3,938,742 | A | 2/1976 | Corson, Jr. |
| 3,940,067 | A | 2/1976 | Cherry et al. |
| 4,026,472 | A | 5/1977 | Rabone |
| 4,039,146 | A | 8/1977 | Wagenknecht |
| 4,043,508 | A | 8/1977 | Speir et al. |
| 4,050,242 | A | 9/1977 | Dusa |
| 4,137,286 | A | 1/1979 | Bornstein |
| 4,220,001 | A | 9/1980 | Beichel |
| 4,223,606 | A | 9/1980 | Bornstein |
| 4,290,262 | A | 9/1981 | Wynosky et al. |
| 4,501,393 | A | 2/1985 | Klees et al. |
| 4,573,412 | A | 3/1986 | Lovelace et al. |
| 4,574,700 | A | 3/1986 | Lewis |
| 4,947,644 | A | 8/1990 | Hermant |
| 5,067,316 | A | 11/1991 | Bonniot |
| 5,078,336 | A | 1/1992 | Carter |
| 5,111,657 | A | 5/1992 | Hivert et al. |
| 5,220,787 | A | 6/1993 | Bulman |
| 5,292,069 | A | 3/1994 | Thayer |
| 5,463,866 | A | 11/1995 | Klees |
| 5,537,815 | A | 7/1996 | Marguet et al. |
| 6,050,085 | A | 4/2000 | Mayer |
| 6,213,431 | B1 | 4/2001 | Janeke |
| 6,568,171 | B2 | 5/2003 | Bulman |
| 6,591,603 | B2 | 7/2003 | Dressler et al. |
| 6,845,607 | B2 | 1/2005 | Lair |
| 7,477,966 | B1 * | 1/2009 | Mango .................. 701/13 |
| 2004/0079072 | A1 | 4/2004 | Shumate |
| 2005/0017132 | A1 | 1/2005 | Janeka |
| 2005/0155341 | A1 | 7/2005 | Germain et al. |

OTHER PUBLICATIONS

R.A. O'Leary and J.E. Beck, "Nozzle Design," *Threshold Journal* (1992) The Boeing Company, pp. 1-13.

* cited by examiner

THRUST AUGMENTATION IN PLUG NOZZLES AND EXPANSION-DEFLECTION NOZZLES

BACKGROUND OF THE INVENTION

1. Field of the Invention

This invention resides in the technology of nozzle design for rocket propulsion systems.

2. Description of the Prior Art

Rocket-powered launch vehicles require high thrust at takeoff due to the large amount of unburned fuel initially present in the vehicle. For vehicles that are launched from the earth's surface, takeoff typically occurs at sea level while the vehicle performs its primary mission at high altitude where the external pressure is lower and is often at high vacuum. To perform its primary mission effectively, the vehicle must produce a high specific impulse ($I_{sp}$), i.e., a high ratio of thrust to the weight of fuel consumed in a unit of time. This is most readily achieved when the engine has a nozzle with a high area ratio, which is the ratio of the area at the nozzle exit to the area at the throat. Nozzles with high area ratios tend to produce relatively low thrust at sea level, however, because of a reverse pressure differential near the nozzle exit that occurs when the wall pressure is below ambient pressure. This reverse pressure differential produces a negative thrust component in the portion of the nozzle near the exit, i.e., a thrust component whose direction is opposite to the forward direction of the vehicle. This negative component reduces the total thrust produced by the nozzle.

One method in the prior art to eliminate this negative component of the sea level thrust without compromising the thrust in a high vacuum environment is the use of a nozzle of variable area, i.e., one in which the area at the exit is reduced for launch and then gradually increased during ascent. The variation is achieved by constructing the nozzle with the capability of adjustments to the contour, area ratio and length of the nozzle as the vehicle altitude increases. Features such as these add considerable complexity and weight to the engine construction, however, and they are less than fully successful since the nozzle in most cases continues to produce less thrust at sea level than at vacuum. Other methods have included the use of combination-type engines using different fuels at different stages. Typical such combinations are kerosene-fueled engines combined with engines derived from the Space Shuttle Main Engine (SSME), kerosene-fueled engines combined with hydrogen-fueled engines such as the Russian RD-701 engine, the dual-fuel-dual-expander engine concept described by Beichel, R., in U.S. Pat. No. 4,220,001 (issued Sep. 2, 1980), and the dual-thrust rocket motor of Bornstein, L., U.S. Pat. No. 4,137,286 (issued Jan. 30, 1979) and U.S. Pat. No. 4,223,606 (issued Sep. 23, 1980). The Beichel engine requires a complex nozzle design that incorporates two thrust chambers, while the Bornstein motor achieves dual thrust by using separate sustainer and booster propellant grains in the combustion chamber, together with an igniter and squib that are inserted into the grain itself. A further alternative is the introduction of secondary combustion gas near the wall of the divergent section of the nozzle, as described by Bulman, M., in U.S. Pat. No. 6,568,171 (issued May 27, 2003).

Of further possible relevance to this invention are space vehicles, notably those that are designed to undergo ascent, descent, or both in high-vacuum environments such as the surface of the moon, either to return to earth or to enter a lunar orbit. These vehicles require very deep throttling upon approaching the landing surface and the need to vary thrust upon takeoff from a very high level at the take-off surface to a lower level when landing on the moon.

SUMMARY OF THE INVENTION

The present invention resides in propulsion systems that combine elements of secondary combustion with a variety of nozzles, including both expansion-deflection nozzles and plug nozzles, to achieve thrust augmentation in atmospheres, such as sea level or the lunar surface, where the nozzle would otherwise experience a negative thrust component.

One propulsion system in accordance with the invention is based on a supersonic nozzle with a combustion zone, a throat, and a supersonic divergent section, with an expansion-deflection design including a flow deflector in the center of the nozzle. In certain examples of this type of system, the flow deflector is mounted to the end of a shaft that extends through the combustion chamber and terminates in a flared or expanded end inside the divergent section. Combustion occurs in the annular passage between the shaft and the nozzle wall, and a throat for supersonic flow is formed between the flared end of the deflector and the nozzle wall. The flared end directs the combustion gas emerging from the throat outward toward the wall of the divergent section to increase the pressure at the wall. Thrust augmentation in accordance with this invention is achieved in this example by the inclusion of flow passages inside the flow deflector that introduce unreacted fuel and oxidizer into the core region of the divergent section when thrust augmentation is needed. Thus introduced, the fuel and oxidizer combust in the core region to form a secondary combustion gas, increasing the pressure in the divergent section of the nozzle and providing added thrust due to the pressure exerted by the secondary combustion gas against the aft face of the flared end of the flow deflector and to the added pressure exerted against the nozzle wall by the compression of the primary combustion gas. When no longer needed, the flow of fuel and oxidizer through the deflector is discontinued, saving both fuel and oxidizer. The flow deflector thus serves both as a means of diverting primary combustion gas toward the wall to the supersonic section to increase the pressure at the wall and a means of supplying secondary combustion gas at low altitudes to augment the thrust and control all of the combustion gas flow in the supersonic section.

In another expansion-deflection propulsion system in accordance with this invention, thrust augmentation is achieved by placing the injectors in the wall of the divergent section rather than in the flow deflector. Fuel and oxidizer are introduced through these injectors to combust in an annular region of the divergent section surrounding the combustion gas from the primary combustion. Augmented thrust in this system is provided by injecting combustible fluids around the periphery of the primary combustion gas, compressing the primary combustion gas toward the axis of the nozzle.

Other propulsion systems with thrust augmentation in accordance with this invention are plug nozzles, i.e., nozzles in which combustion gases are directed against a centerbody extending from the nozzle in the aft direction. The contour of the centerbody and the angle of impact of the combustion gases against the centerbody produce a forward thrust. With no shroud surrounding the centerbody, the external boundary of the flow path of the combustion gas is limited only by the external atmosphere. The expansion of the combustion gas thus varies with altitude, thereby allowing the nozzle to compensate for altitude changes. In one example of the incorporation of features to provide augmented thrust, injectors for uncombusted fuel and oxidizer are placed in a short shell encircling the forward end of the centerbody. The fuel and oxidizer that are injected through these injectors combust in a region that surrounds the flow path of the primary combustion gas, thus compressing the primary combustion gas against the centerbody. In another example, injectors for uncombusted fuel and oxidizer are placed in the centerbody itself at locations toward the forward end. Fuel and oxidizer from these injectors form a central flow region where the fuel and oxidizer combust and displace the primary combustion gas from the centerbody.

Nozzles in accordance with this invention are useful in a variety of rocket-powered vehicles, including space vehicles for the reasons stated in the "Description of the Prior Art" above.

These and other features, embodiments, and advantages of the invention will be apparent from the description that follows.

DETAILED DESCRIPTION OF THE INVENTION AND PREFERRED EMBODIMENTS

Figure 1:
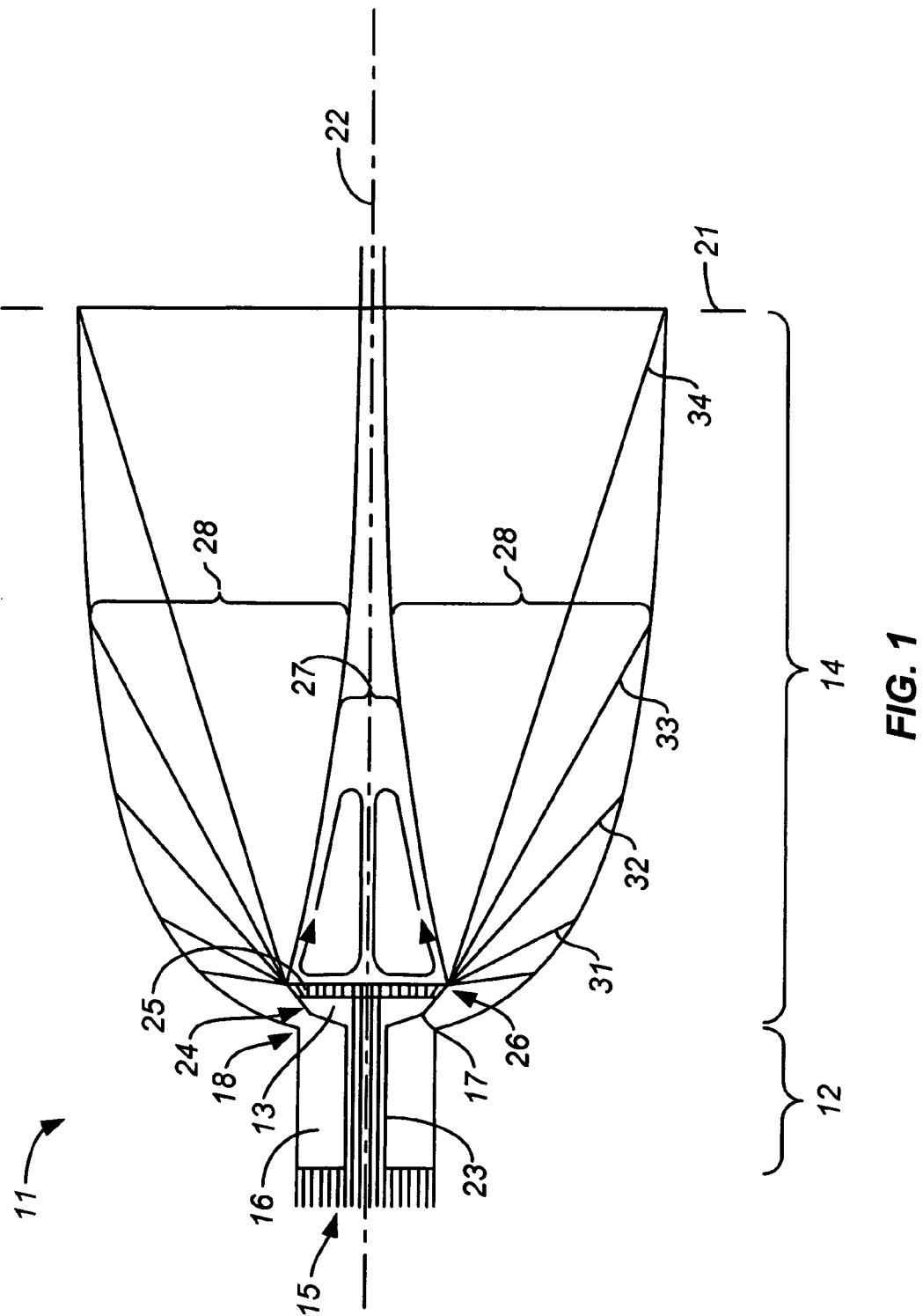
FIG. 1 is a cross section, taken along a longitudinal axis, of a supersonic expansion-deflection nozzle in accordance with the present invention, in operation in an unaugmented thrust mode.

Supersonic expansion-deflection nozzles are defined by a convergent section, a throat, a divergent section, and a flow deflector near the forward end of the divergent section. The nozzle is preferably symmetrical about a longitudinal axis, either with mirror-image contours or as a body of revolution about the axis. In preferred embodiments of this invention, the divergent section has an axial profile of continuous curvature. By "axial profile" is meant the profile of the divergent section determined by a cross section along a plane that includes the nozzle axis. A "continuous curvature" is one that forms a smooth curve with no abrupt changes in radius of curvature and no changes in the direction of curvature, although the radius of curvature may vary or remain constant. This is distinct from nozzles with discontinuous, or stepwise changes in, curvature such as those nozzles designed to cause the combustion gas inside the divergent section to separate from the wall of the section at the discontinuity. The term "curve" is used in the mathematical sense and includes straight lines as well as conventional curves, thus including both conical nozzles and hyperbolic or bell-shaped nozzles.

The present invention extends to expansion-deflection nozzles that cause the jet to separate from the wall near the nozzle exit due to overexpansion as well as expansion-deflection nozzles in which the jet does not separate. The invention is particularly useful in overexpanded nozzles. The term "overexpanded nozzle" is used herein as it is in the rocketry art to mean a nozzle in which the area ratio, defined as the ratio of the area at the nozzle exit to the area at the throat, is so great that the gas expansion occurring in the nozzle results in a gas pressure at the nozzle exit that is below ambient pressure at sea level. Area ratios that achieve this may vary, and the nozzle configuration that produces overexpansion will vary with the chamber pressure, the area ratio and the ambient pressure. For nozzles operated at relatively low chamber pressure such as 800 psia or thereabouts, overexpansion can occur with an area ratio as low as 7:1. For nozzles operated at higher chamber pressures, the area ratios at which overexpansion occurs are considerably higher. In general, therefore, when the invention is applied to overexpanded nozzles, the area ratio may be about 25:1 or higher, preferably from about 25:1 to about 150:1, and more preferably about 65:1 to about 85:1. SSME Class engines, for example, have area ratios in the range of 74:1 to 80:1. Area ratios of 77.5:1 or less, for example 70:1 to 77.5:1, are preferred.

Nozzles of this invention will generally have a longitudinal axis along the direction of gas flow through the nozzle. Cross sections of the nozzle that are transverse to this axis may vary in shape, including elongated shapes such as elliptical or rectangular cross sections, as well as square or circular cross sections. In certain embodiments of the invention, however, the nozzles are bodies of revolution about the longitudinal axis, i.e., with circular cross sections whose radii vary along the axis.

Other dimensions of expansion-deflection nozzles in accordance with this invention may vary as well and are not critical to this invention. A typical SSME may have a nozzle throat diameter of 10.3 inches (24 cm), increasing to a diameter of 90.7 inches (230 cm) at the nozzle exit over a length of 121 inches (307 cm). The area ratio of this nozzle is 77.5:1 and the length of the nozzle is equal to 80% of a 15° conical nozzle. Typical operating conditions of a conventional nozzle of this type, before being modified in accordance with the present invention, are a sea level thrust of 355,000 pounds-force (1,580,000 newtons), a gas flow rate of 970 pounds/second (440 kg/sec), a sea-level $I_{sp}$ of 365, a nozzle exit pressure of 2 psia, a vacuum thrust of 442,000 pounds-force (1,966,000 newtons) and a vacuum $I_{sp}$ of 455. With the addition of a secondary combustion gas in accordance with the present invention, the sea level thrust can be increased to almost three times the value quoted above.

In certain expansion-deflection nozzles of this invention, the flow deflector is mounted at the end of a shaft that extends through the combustion zone, while in others, the flow deflector lacks a shaft and is fully contained in a flared body that resides entirely in the divergent section of the nozzle. For those flow detectors that are mounted to a shaft, the width of the shaft, and accordingly the cross section of the annular passage between the shaft and the wall of the combustor, can vary widely and are not critical to the invention. The shaft need only be wide enough to accommodate the internal flow passage or passages for the propellant and oxidizer that burn in the divergent section to form the secondary combustion gas. In most cases, best results will be achieved when the cross section of the annular passage constitutes from about 20% to about 90%, and preferably from about 20% to about 50%, of the total cross section area of the combustor, i.e., the combined cross sections of the annular passage and the shaft.

While the throat can assume any of a variety of configurations, the preferred configurations are those in which the throat is formed between the flow deflector and the opposing wall of the nozzle. In the case of a shaft-mounted flow deflector, the throat can be toroid-shaped, extending continuously around the circumference of the flared end of the flow deflector. For flow deflectors that are not supported by a shaft, a series of discrete throats can be distributed around the circumference of the flow deflector, separated by mounting structures such as webs to secure the deflector to the nozzle wall.

With or without a supporting shaft, the flared portion, i.e., the deflecting portion, of the deflector directs the primary combustion gas outward, away from the nozzle axis and toward the wall of the divergent section. The flared portion of the deflector deflects the gas flow outward and the aft face of the deflector can be curved or flat. In embodiments in which the deflector is supported by a shaft and the passages for fuel and oxidizer extend through the shaft, these passages terminate in injectors distributed across the aft face of the flared portion. The injectors direct the fuel and oxidizer into the central core that is surrounded by the annular region occupied by the deflected primary combustion gas.

When the principles of this invention are applied to plug nozzles rather than expansion-deflection nozzles, the combustion gases producing the primary thrust can be introduced through a variety of configurations. One example is the use of a single toroidal combustion chamber with a toroidal throat encircling the centerbody. Another is a series of individual combustion chambers distributed around the centerbody, each with its own throat. Still another is an elongated nozzle with an elongated centerbody and elongated combustion chambers on opposite sides of the centerbody. Injectors for fuel and oxidizer are preferably distributed in each case in a symmetrical arrangement around the centerbody. In preferred embodiments, the centerbody and the nozzle in general are a body of revolution that is axisymmetrical about the longitudinal axis. In terms of the injectors, certain configurations include a plurality of injectors for both fuel and oxidizer, either in an alternating arrangement or in adjacent but separate rows.

The propulsion system of this invention can be used with any known liquid propellants, including monopropellants and bipropellants. The term bipropellant as used herein refers to a combination of fuel and oxidizer. Examples of liquid fuels are liquid hydrogen ($H_2$), hydrazine, methyl hydrazine, dimethyl hydrazine, and dodecane (kerosene). Examples of liquid oxidizers are liquid oxygen ($O_2$), nitrogen tetroxide, and nitric acid. The amounts of fuel and oxidizer supplied through the injectors, both in absolute terms and relative to the primary combustion gas, can vary widely, depending on the thrust needs of the system, the area ratio of the nozzle and other parameters. In most cases, best results will be achieved when the fuel and oxidizer upon combustion produce a secondary combustion gas at a volumetric flow rate that is from about 25% to about 75% of the volumetric flow rate of the primary combustion gas. The fuel and oxidizer can be combined as a common stream prior to their entry into the nozzle, or supplied to separate injectors. In expansion-deflection embodiments, for example, where the fuel and oxidizer are supplied through the deflector shaft, the fuel and oxidizer are preferably flow in separate passages through the shaft to emerge through a larger number of injectors distributed across the aft face of the deflector. In all embodiments, the use of separate injectors for fuel and oxidizer for the secondary combustion is preferred, limiting contact between fuel and oxidizer to regions downstream of the injectors, where the fuel and oxidizer will both combust and provide secondary thrust. In various embodiments, this will allow the fuel and oxidizer to serve as coolants for the nozzle or for portions of the nozzle, particularly if a cryogenic fuel and oxidizer are used.

While this invention covers a wide range of configurations, geometries, and applications, an understanding of the features that are common to all embodiments and that define the invention and its operation as a whole can be obtained by a review of specific examples. The drawings accompanying this specification and their description below relate to certain examples; others will be readily apparent to those skilled in the art.

FIG. 1 is a longitudinal cross section of an overexpanded expansion-deflection nozzle 11 of the present invention, and is not drawn to scale. The component sections of the nozzle are a combustion chamber 12, a flow deflector 13, and a divergent section 14. Primary injectors 15 of fuel and oxidizer are positioned at the entrance to the combustion chamber 12, i.e., at its fore end, the fore direction being to the left in the view shown in the Figure. Combustion occurs in an annular region 16 of the combustion chamber 12. A throat 18 is formed in the passageway between the nozzle wall and the flow deflector 13. The throat is located at the intersection between the wall of the combustion chamber 12 at the aft end of the chamber and the wall of the divergent section 13 at the fore end of the divergent section, which faces a ridge 17 in the lateral contour of the flow deflector 13. The combustion gas produced by the fuel and oxidizer that are fed by the primary injectors 15 passes through the throat 18 to enter the divergent section where the expanding combustion gas produces primary thrust. The combustion gas thus generally flows from left to right in the view shown in the Figure, leaving the nozzle at the nozzle exit plane 21.

The nozzle, including all sections, is an axisymmetrical body of revolution about a longitudinal axis 22. The flow deflector 13 in this nozzle has an external contour that is likewise a body of revolution about its longitudinal axis and is mounted in the nozzle 11 coaxially with the nozzle. The mounting structure by which the deflector is mounted to the outer portions of the nozzle is not shown, but can be the same as that of expansion-deflection nozzles of the prior art and is typically at the fore end of the deflector. The deflector is mounted to a shaft 23 that passes through the combustion chamber 12, and terminates in a flared end 24 extending into the divergent section 14. The aft face 25 of the deflector is flat (planar) in this embodiment and is perpendicular to the longitudinal axis 22 of the nozzle and the deflector. The primary combustion gas generated in the combustion chamber 12 passes through the throat 18, then continues past the flared end 24 where the combustion gas is diverted outward.

In the configuration shown in FIG. 1, the nozzle is in an unaugmented mode, with only the primary combustion gas passing through the nozzle. The divergent wall of the divergent section 14 causes the primary combustion gas to expand outward and accelerate to a low supersonic Mach number. Additional expansion occurs inward toward the axis 22 as a result of Prandtl-Meyer expansion at the aft rim 26 of the deflector 13, i.e., the outward extremity of the flared end 24. Extending aft of the flared end 24 of the deflector is a core region 27 of circulating flow at a pressure substantially below that of the outer region 28 of the expanding combustion gas. Expansion waves 31, 32, 33, 34 emanate from the aft rim 26 of the deflector.

Figure 2:
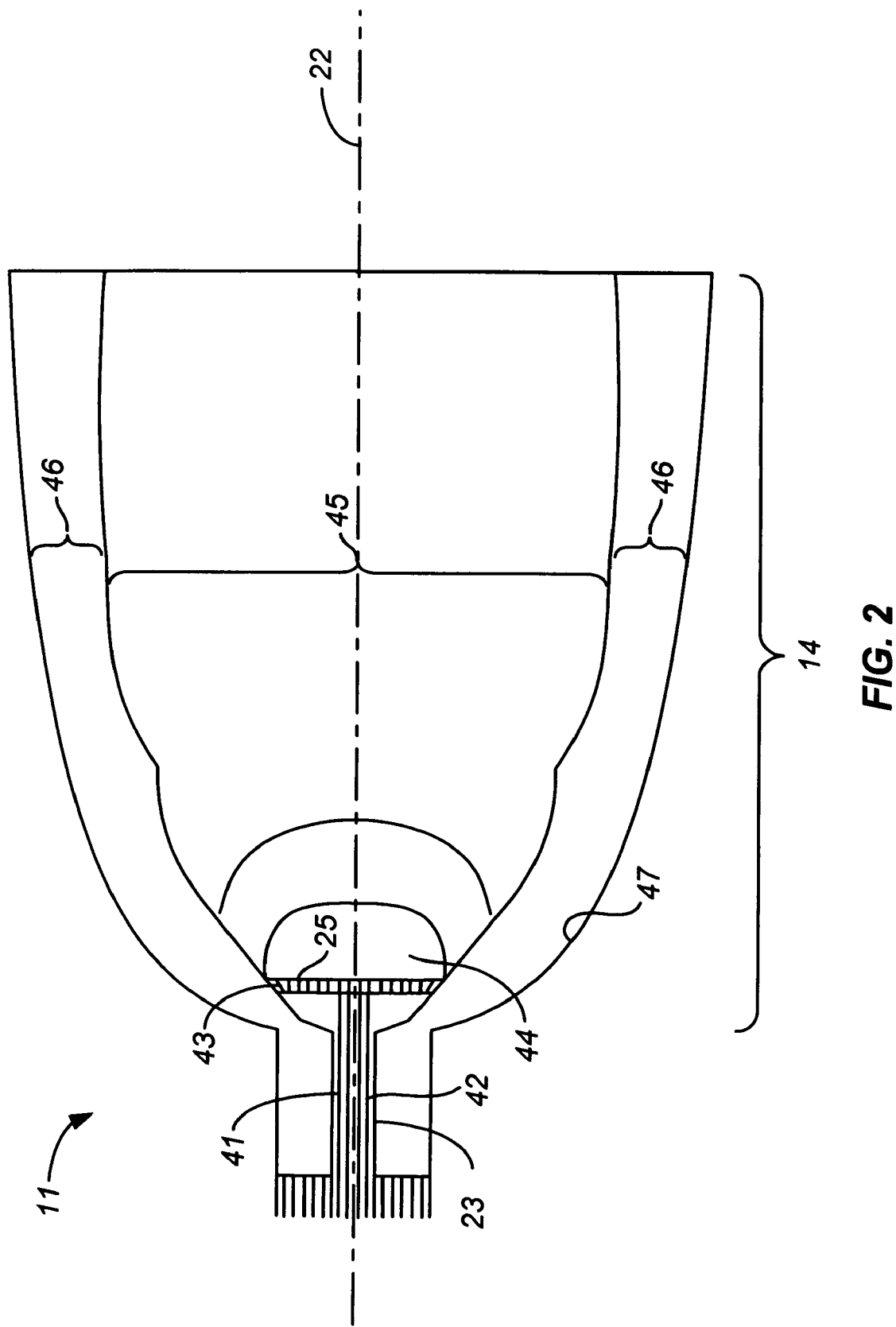
FIG. 2 is the nozzle of FIG. 1 in the same cross section view, with the nozzle in an augmented thrust mode.

FIG. 2 depicts the same expansion-deflection nozzle 11 but in augmented thrust mode of operation. In this mode, secondary fuel and oxidizer are fed through separate internal passages 41, 42, respectively, in the shaft 23 to leave the deflector through a large number of injectors 43 in the aft face 25 of the deflector. Once injected, this secondary fuel and oxidizer react in a secondary combustion zone 44 of the divergent section 14 of the nozzle aft of the deflector to form the secondary combustion gas. This hot secondary combustion gas fills the otherwise low-pressure core 27 (FIG. 1) and reduces the inward expansion of the primary combustion gas. The secondary combustion gas itself forms an expanding flow field 45 that compresses the primary combustion gas 46 against the wall of the divergent section 14, the combined flow fields of the primary and secondary combustion gases together filling the entire cross section of the nozzle. Thrust augmentation results from the increase in pressure that the secondary combustion gas imposes on the aft face 25 of the deflector and from the higher pressures of both the primary and secondary combustion gases on the inner wall surface 47 of the divergent section of the nozzle.

As an illustration of the propulsion conditions that can be obtained in a nozzle as depicted in FIGS. 1 and 2, the nozzle can be constructed with an area ratio of 75 and operated at a combustion pressure $P_c$ of 2,000 psia ($13.8 \times 10^6$ Pa) in the combustion zone 16. In the unaugmented mode represented by FIG. 1, the supersonic flow at the exit plane 21 can expand to an exit pressure $P_e$ of 1.5 psia ($10.3 \times 10^3$ Pa) and reach a Mach number $M_e$ of 5.07. If sufficient secondary combustion gas is added in the augmented mode to increase the total combustion gas by 40%, the secondary combustion can produce a pressure $P_b$ of 100 psia ($689.5 \times 10^3$ Pa) at the aft face 25 of the flow deflector. The flow in the core region 45 at the nozzle exit 16 will then reach a Mach number $M_e$ of 2.75 at a pressure $P_e$ of 3.4 psia ($23.4 \times 10^3$ Pa), while the flow in the annular region 46 will reach a Mach number $M_e$ of 4.55, at the same pressure $P_e$ of 3.4 psia ($23.4 \times 10_3$ Pa). This can eliminate the negative thrust component and increase the thrust by 40%. These figures are only examples; nozzles of this general configuration can be operated over a wide range of conditions and thrust levels.

Figure 3:
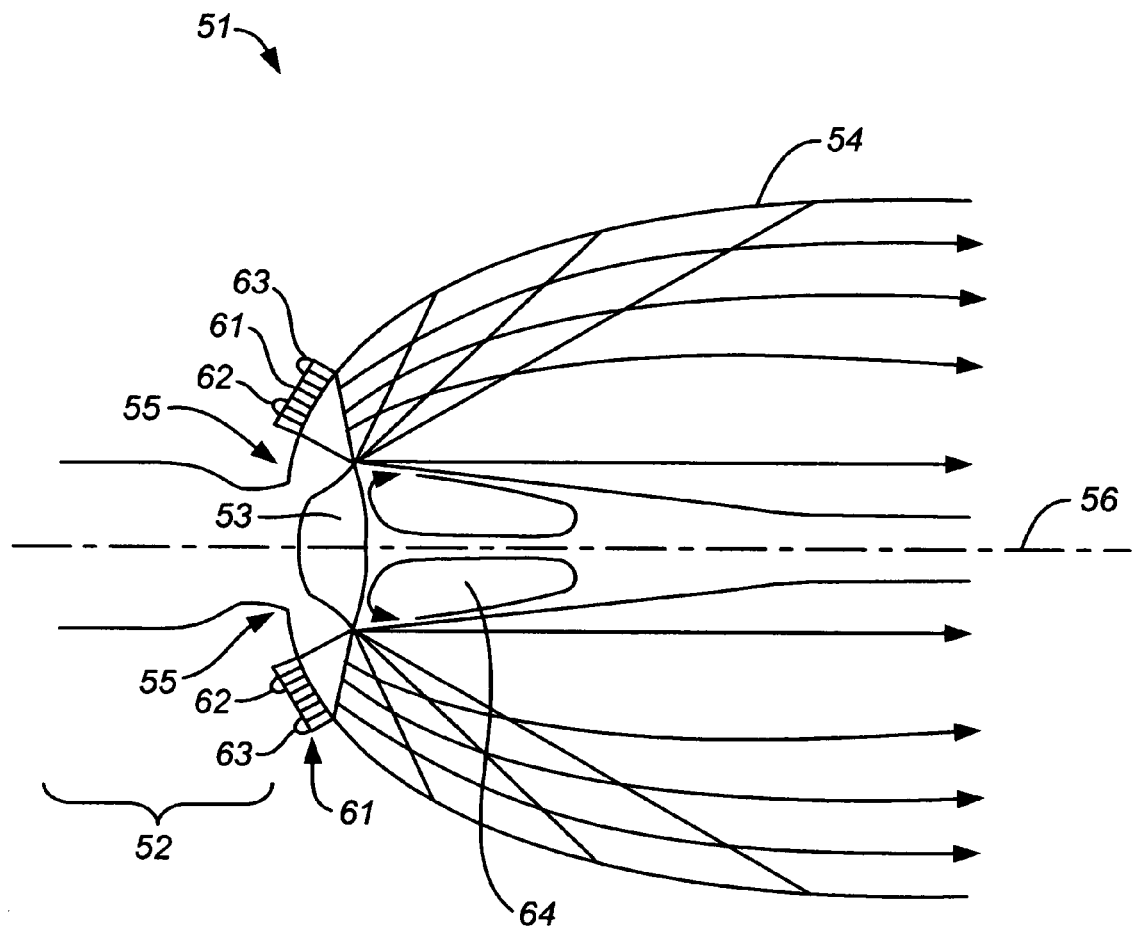
FIG. 3 is a cross section, taken along a longitudinal axis, of a second supersonic expansion-deflection nozzle in accordance with the present invention, in operation in an unaugmented thrust mode.

FIG. 3 is a longitudinal cross section of a second expansion-deflection nozzle 51 bearing features of the present invention. The component sections of this nozzle include a combustion chamber 52, a flow deflector 53, a divergent section 54, with an annular throat 55 around the flow deflector. As in the nozzle of FIGS. 1 and 2, the throat is defined by the contours of the flow deflector 53 and the opposing wall of the nozzle. The flow deflector 53 differs from that of FIGS. 1 and 2 by the lack of a shaft, i.e., it does not contain a shaft corresponding to the shaft 23 in the flow deflector of FIGS. 1 and 2. The flow deflector 53 in this embodiment is instead mounted inside the nozzle by webs, struts, or equivalent mounting structures (not shown) that traverse the throat gap. In this embodiment as in that of FIGS. 1 and 2, the nozzle and the flow deflector are both axisymmetrical bodies of revolution (except for any webs or other mounting structures for the flow deflector) about a longitudinal axis 56 and the direction of flow of combustion gas is left to right. The fore direction of the nozzle is thus to the left while the aft direction is to the right.

Injectors for uncombusted bi-propellant 61 are positioned in the divergent section downstream of the throat. Separate injectors are provided for fuel 62 and oxidizer 63. In the configuration shown in FIG. 3, the nozzle is in an unaugmented mode of operation with only the primary combustion gas passing through the nozzle. Formation of the primary combustion gas by combustion of primary propellants occurs in the combustion chamber 52. Once formed, the combustion gas passes through the throat 62 and is diverted outward by the flow deflector 53. The combustion gas then expands inward due to Prandtl-Meyer expansion, leaving a core region 64 of circulating flow as in FIG. 1.

Figure 4:
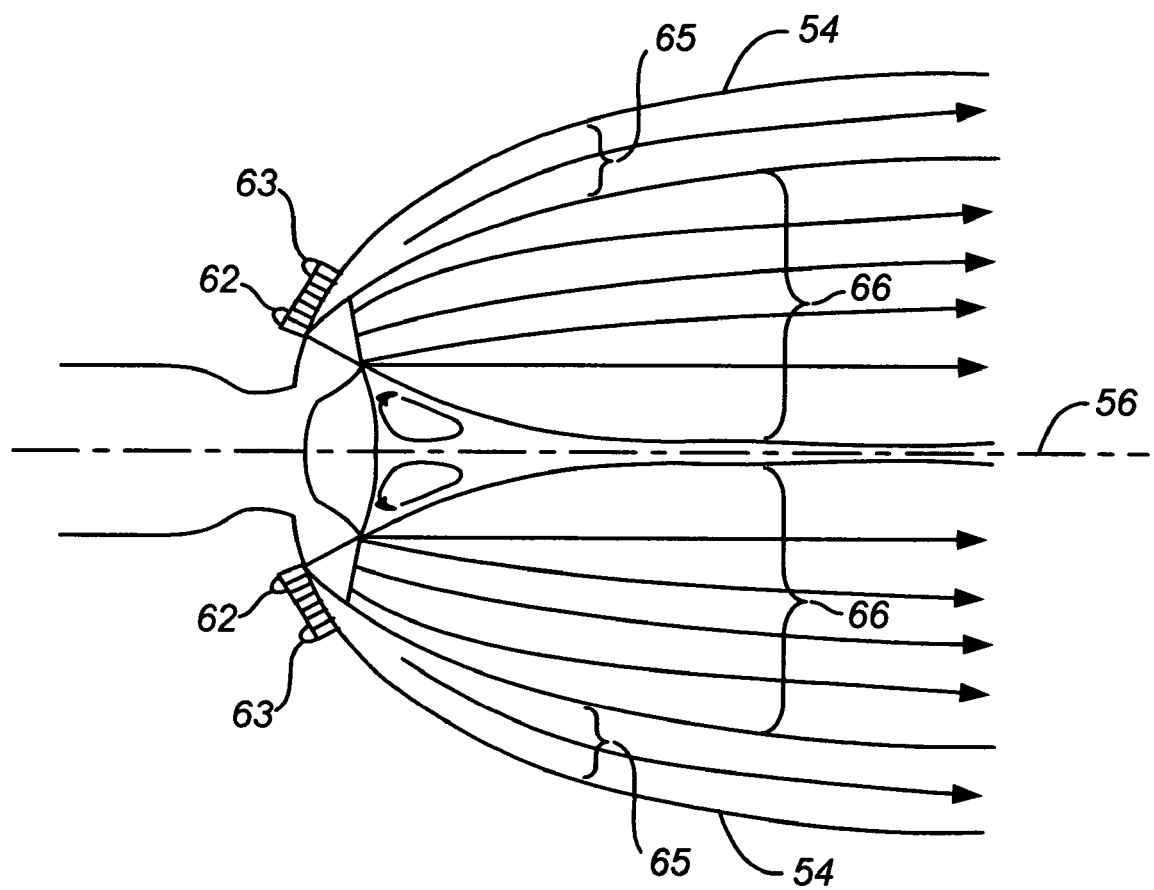
FIG. 4 is the nozzle of FIG. 3 in the same cross section view, with the nozzle in an augmented thrust mode.

The same nozzle is depicted in an augmented thrust mode in FIG. 4. In this mode, fuel and oxidizer are fed through the secondary injectors 62, 63, respectively. Combustion of these added propellants occurs in a secondary combustion zone 65 which is an annular region of the divergent section 54 immediately adjacent to the wall of the divergent section. The secondary combustion gas in this zone compresses the region 66 occupied by the primary combustion gas toward the axis 56 and reduces the size of the core region 64. Operating parameters that are the same as those discussed above in connection with FIGS. 1 and 2 can be used here as well.

Figure 5:
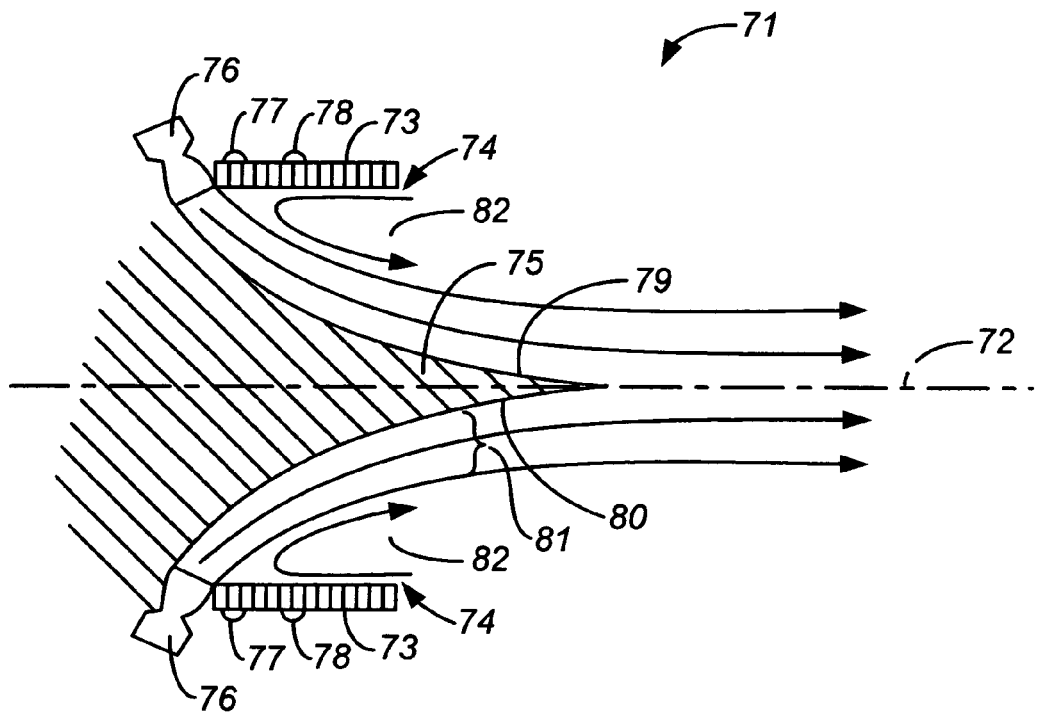
FIG. 5 is a cross section, taken along a longitudinal axis, of a plug nozzle in accordance with the present invention, in operation in an unaugmented thrust mode.
Figure 6:
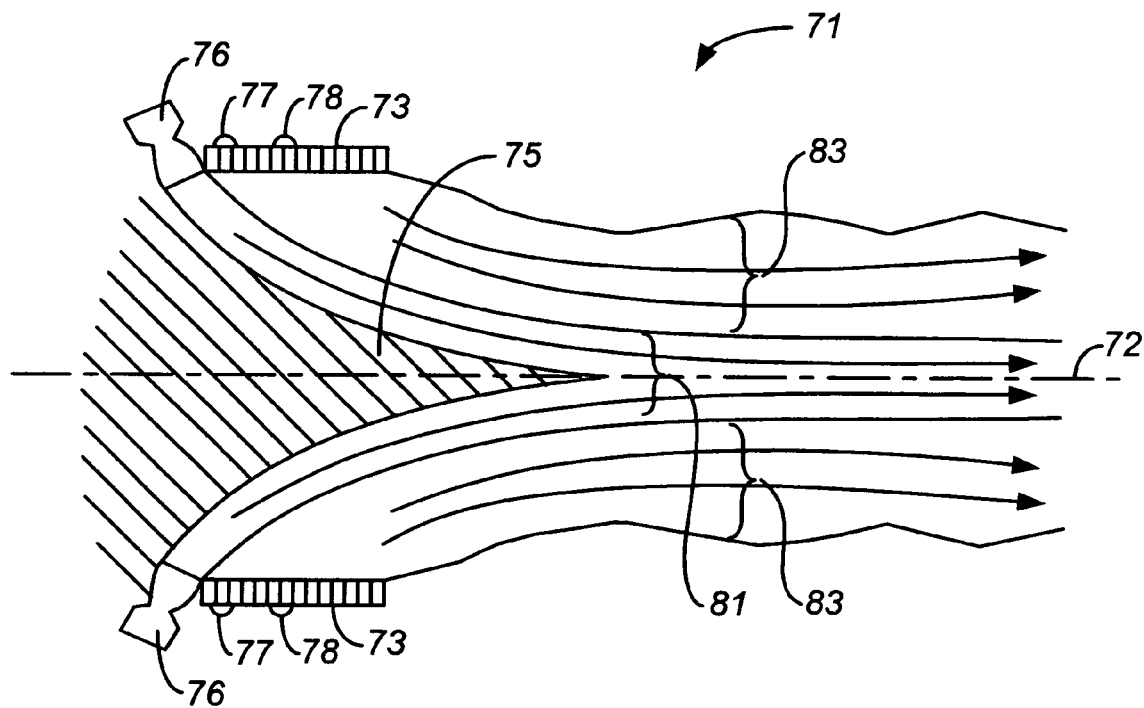
FIG. 6 is the nozzle of FIG. 5 in the same cross section view, with the nozzle in an augmented thrust mode.

FIGS. 5 and 6 depict a plug nozzle 71 adapted to incorporate features of the present invention. The nozzle can be of extended width having a cross section as shown in these Figures that is constant along the width of the nozzle. Alternatively, the nozzle can be a body of revolution around a longitudinal axis 72, with cross section as shown. In either case, the component parts of the nozzle are a shell 73 with a mouth 74 opening in the aft direction, a centerbody 75 that is tapered and extends aft of the mouth, a series of combustion chambers 76 arranged around the centerbody 75, and injectors 77, 78 in the shell for fuel and oxidizer, respectively. Each of the combustion chambers 76 is itself a convergent-divergent nozzle with a throat, with full combustion occurring inside each combustion chamber. The profile of the centerbody 75 in this example consists of opposing concave curves 79, 80.

The unaugmented thrust mode is shown in FIG. 5, where the primary combustion gases from the combustion chambers 76 flow in a primary thrust region 81 bordered by the centerbody 75, while the orientation of the combustion chambers 76 and the contour of the centerbody 75 produces a primary thrust. Here, as in FIGS. 1 and 2, the forward direction of the nozzle is to the left and the aft direction is to the right, with combustion gases flowing in the aft direction. An air aspiration zone 82 exists in the annular region between the shell 73 and the centerbody 75.

In augmented thrust operation, the flow patterns within the nozzle appear as shown in FIG. 6. Here, fuel and oxidizer are injected through the injectors 77, 78 in the shell to combust in a secondary thrust region 83 that is contiguous with, and surrounding, the primary thrust region 81, adding to the force against the centerbody 75 and hence to the overall thrust. The combustion gas formed in the secondary thrust region 83 eliminates the aspiration zone 82 and compresses the primary combustion gas against the centerbody.

Figure 7:
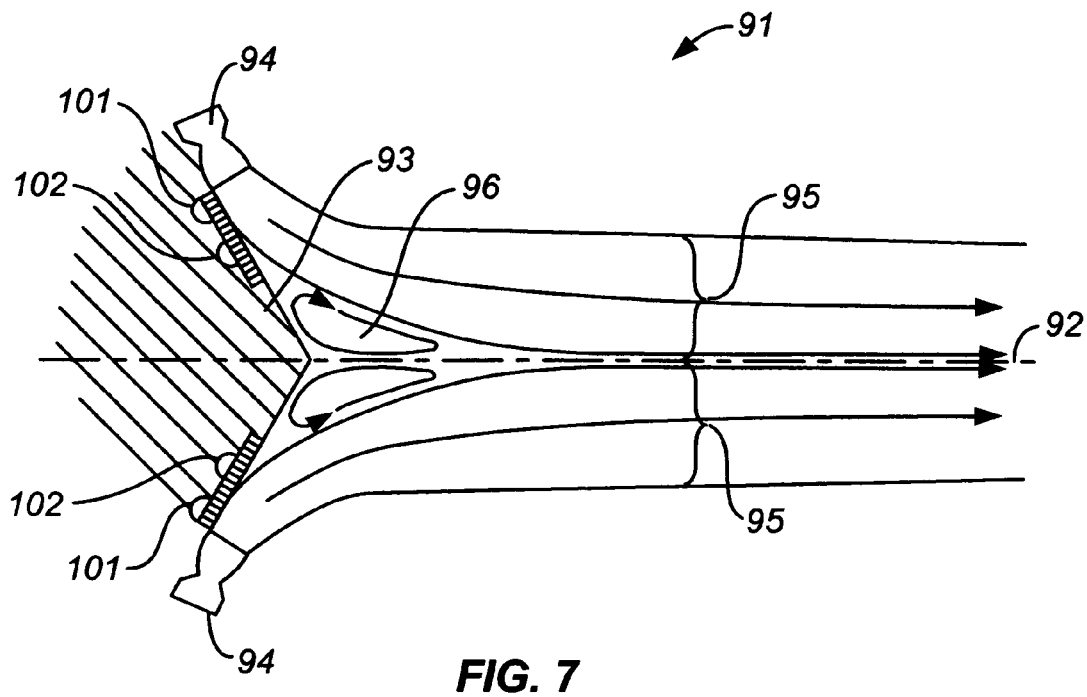
FIG. 7 is a cross section, taken along a longitudinal axis, of a second plug nozzle in accordance with the present invention, in operation in an unaugmented thrust mode.
Figure 8:
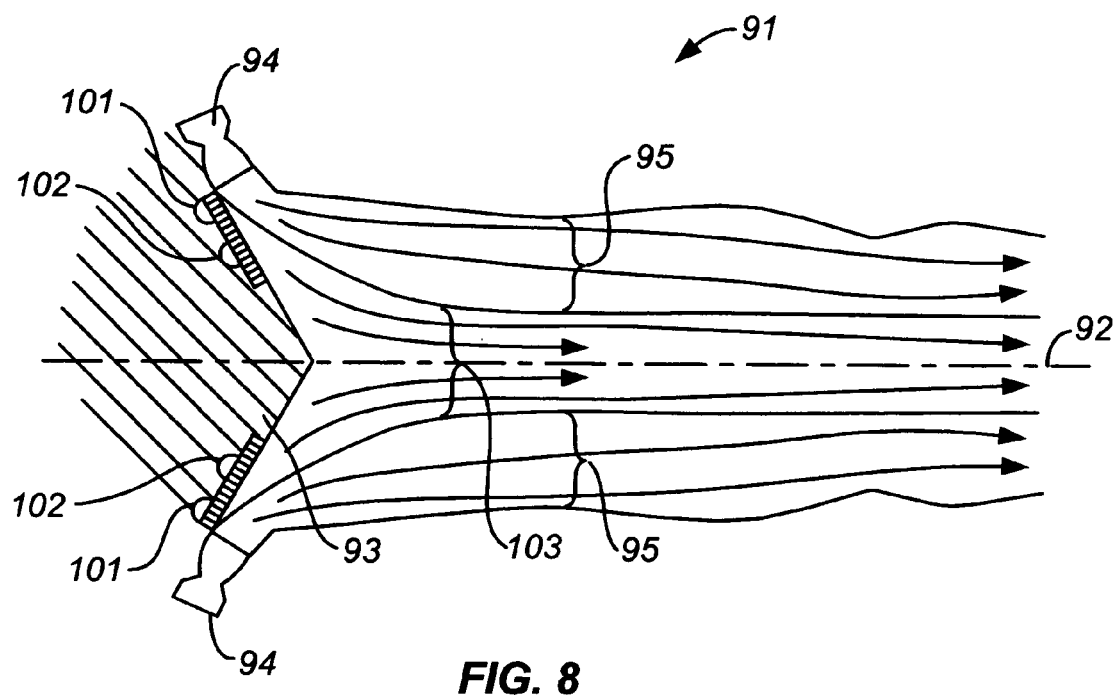
FIG. 8 is the nozzle of FIG. 7 in the same cross section view, with the nozzle in an augmented thrust mode.

Another plug nozzle 91 illustrating the invention is shown in FIGS. 7 and 8, likewise shown in cross section. This nozzle contains a centerbody 93 and a series of combustion chambers 94 arranged around the centerbody and oriented in directions that cause the primary combustion gas emerging from the combustion chambers to strike the centerbody surfaces and thereby produce a primary thrust. Here again, the nozzle can be of extended width and a cross section that is constant along the width, and the centerbody can be wedge-shaped, or the nozzle can be a body of revolution around a longitudinal axis 92. For a nozzle that is a body of revolution, the cross section shown in the Figures is a plane passing through the axis 72 and the centerbody is a cone. The centerbody 93 in this nozzle is not as long in the longitudinal direction as that of the plug nozzle of FIGS. 5 and 6 and is therefore more blunt with a cross sectional profile consisting of straight lines. Nevertheless, the nozzle produces a primary thrust in a manner analogous to that of the plug nozzle of FIGS. 5 and 6 due to the taper of the centerbody and the orientation of the combustion chambers. As in the nozzle of FIGS. 5 and 6, each of the combustion chambers 94 is itself a convergent-divergent nozzle with a throat, and with full combustion occurring inside each combustion chamber. The unaugmented thrust mode is shown in FIG. 7, with primary combustion gas 95 flowing in the aft direction (left-to-right in the view shown in the Figure), leaving a recirculation zone 96 in the center immediately aft of the centerbody 93.

In the plug nozzle of FIGS. 7 and 8, the propellant injectors 101, 102 are formed in the centerbody 93. In the unaugmented mode of operation, shown in FIG. 7, the injectors are not actuated, and the only gas flowing past the centerbody and through the nozzle is the primary combustion gas 95 formed in the combustion chambers 94. To achieve augmented operation, propellant in the form of uncombusted fuel and oxidizer is injected into the nozzle through separate injectors 101, 102, respectively. The injected fuel and oxidizer form a secondary flow region 103 at the center of the nozzle adjacent to the axis 92, eliminating the recirculation zone 96 and forcing the primary combustion gas 95 outward. The injected fuel and oxidizer combust in this secondary flow region 103 to provide the secondary thrust that augments the primary thrust from the primary combustion gas 95.

The systems shown in FIGS. 5, 6, 7, and 8 can be operated under the same operating parameters as those presented above in connection with FIGS. 1 and 2.

The foregoing is offered primarily for purposes of illustration. Further variations and modifications that utilize the novel features of this invention and therefore also fall within the scope of this invention will readily occur to the skilled propulsion engineer.

What is claimed is:

1. A propulsion system comprising:
   a rocket nozzle comprising a combustion zone, a throat, and a divergent section disposed along a longitudinal axis to define a serially axial direction of flow extending from said combustion zone, through said throat, and then through said divergent section;
   a flow deflector disposed in said divergent section, said flow deflector having a flared end flaring outward along said direction of flow to deflect combustion gas emerging from said throat away from said longitudinal axis; and
   separate flow passages extending through said flow deflector, said flow passages parallel to said longitudinal axis and terminating at said flared end to separately inject said fluid fuel and oxidizer into said core.

2. The propulsion system of claim 1 wherein said rocket nozzle is an overexpanded nozzle.

3. The propulsion system of claim 1 wherein said rocket nozzle and said flow deflector are axisymmetrical about said longitudinal axis.

4. The propulsion system of claim 1 wherein said rocket nozzle has an area ratio of at least about 25:1.

5. The propulsion system of claim 1 wherein said rocket nozzle has an area ratio within the range of from about 25:1 to about 150:1.

6. The propulsion system of claim 1 wherein said rocket nozzle has an area ratio within the range of from about 65:1 to about 85:1.

7. The propulsion system of claim 1 wherein said combustion gas deflected by said flow deflector is defined as a primary combustion gas, said rocket nozzle creating a volumetric flow rate of said primary combustion gas through said divergent section, and said passages within said flow deflector are sufficiently large relative to said rocket nozzle to produce, upon combustion of said fuel and oxidizer in said divergent section, a secondary combustion gas at a volumetric flow rate equal to from about 25% to about 75% of said volumetric flow rate of said primary combustion gas.

8. The propulsion system of claim 1 wherein said flow deflector has an aft face that is planar.

9. The propulsion system of claim 1 wherein said rocket nozzle and said flow deflector are axisymmetrical about said longitudinal axis, and said flow deflector has an aft face that is planar and perpendicular to said longitudinal axis.

10. The propulsion system of claim 1 wherein flow deflector is mounted to an aft end of a shaft passing through said combustion zone to define an annular passage within said combustion zone around said shaft, said annular passage having a cross section that constitutes from about 20% to about 90% of the combined cross sections of said annular passage and said shaft.

11. The propulsion system of claim 10 wherein said annular passage has a cross section that constitutes from about 20% to about 50% of the combined cross sections of said annular passage and said flow deflector.

* * * * *